US008335762B2

(12) United States Patent
Gbadegesin et al.

(10) Patent No.: US 8,335,762 B2
(45) Date of Patent: Dec. 18, 2012

(54) RESOURCE TRACKING

(75) Inventors: Abolade Gbadegesin, Seattle, WA (US);
Viraj B. Mody, Redmond, WA (US);
David C. Steere, Bellevue, WA (US);
William Michael Zintel, Redmond, WA (US); Bruce W. Copeland, Redmond, WA (US); Atul Adya, Redmond, WA (US); Thomas W. Kleinpeter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 508 days.

(21) Appl. No.: 12/245,972

(22) Filed: Oct. 6, 2008

(65) Prior Publication Data

US 2010/0088300 A1 Apr. 8, 2010

(51) Int. Cl.
*G06F 17/30* (2006.01)

(52) U.S. Cl. ........................................ 707/628

(58) Field of Classification Search ............. 707/3, 628
See application file for complete search history.

(56) References Cited

U.S. PATENT DOCUMENTS

| | | | |
|---|---|---|---|
| 6,286,104 B1 * | 9/2001 | Buhle et al. ................. 726/4 |
| 6,393,458 B1 * | 5/2002 | Gigliotti et al. ............. 709/203 |
| 6,405,191 B1 | 6/2002 | Bhatt et al. | |
| 6,466,949 B2 | 10/2002 | Yang et al. | |
| 6,643,682 B1 | 11/2003 | Todd et al. | |
| 6,714,962 B1 * | 3/2004 | Helland et al. ............... 709/203 |
| 6,718,327 B1 * | 4/2004 | Edmonds ...................... 1/1 |
| 6,826,560 B1 | 11/2004 | Leymann et al. | |
| 6,910,070 B1 | 6/2005 | Mishra et al. | |
| 6,922,724 B1 * | 7/2005 | Freeman et al. ............. 709/223 |
| 7,111,010 B2 * | 9/2006 | Chen .......................... 1/1 |
| 7,133,846 B1 * | 11/2006 | Ginter et al. ................ 705/54 |
| 7,149,522 B2 * | 12/2006 | Koskelainen .............. 455/435.1 |
| 7,177,859 B2 | 2/2007 | Pather et al. | |
| 7,231,406 B2 * | 6/2007 | Edmonds .................... 1/1 |
| 7,379,963 B1 | 5/2008 | Khare et al. | |
| 7,606,808 B2 * | 10/2009 | McCann et al. ............. 1/1 |
| 7,664,125 B1 * | 2/2010 | Bauer et al. ................. 370/408 |
| 2001/0052024 A1 * | 12/2001 | Devarakonda et al. ....... 709/238 |
| 2002/0059183 A1 * | 5/2002 | Chen .......................... 707/1 |
| 2004/0001498 A1 * | 1/2004 | Chen et al. ................. 370/401 |
| 2004/0003099 A1 * | 1/2004 | House et al. ................ 709/229 |
| 2004/0021622 A1 * | 2/2004 | Nagao et al. ................ 345/60 |

(Continued)

OTHER PUBLICATIONS

Vliet, Van Scott, "Robust E-mail Notification with ColdFusion", Retrieved at <<http://mxdj.sys-con.com/read/37926.htm>>, Jun. 23, 2008, pp. 4.

(Continued)

*Primary Examiner* — Sheree Brown
(74) *Attorney, Agent, or Firm* — Microsoft Corporation

(57) ABSTRACT

Clients may subscribe to resources for the purpose of receiving notifications of changes in the resource (e.g., a file is added to a shared folder). Storing subscriptions within persistent storage provides data security in the event of a service failure, at the cost of high latency in accessing subscription data. An efficient method for tracking a resource is provided herein. A subscription service creates subscriptions and monitors resources for a client. Upon a subscribed resource change, a notification service stores a notification of the change into a queue associated with the client. Efficient resource tracking is achieved because notification and subscription data is stored in low latency soft memory. The notification service is configured to detect a failure in the notification service and/or subscription service. In the event a service fails, the client provides a recovery mechanism by resubscribing to resources the client is interested in.

20 Claims, 8 Drawing Sheets

U.S. PATENT DOCUMENTS

| | | | |
|---|---|---|---|
| 2004/0068481 A1 | 4/2004 | Seshadri et al. | |
| 2004/0167932 A1* | 8/2004 | Edmonds | 707/200 |
| 2004/0205250 A1* | 10/2004 | Bain et al. | 709/249 |
| 2004/0250248 A1* | 12/2004 | Halpern et al. | 718/100 |
| 2005/0111441 A1* | 5/2005 | Koskelainen | 370/352 |
| 2005/0210109 A1* | 9/2005 | Brown et al. | 709/206 |
| 2006/0045072 A1* | 3/2006 | Chevrier et al. | 370/352 |
| 2007/0100834 A1* | 5/2007 | Landry et al. | 707/10 |
| 2008/0008319 A1* | 1/2008 | Poirier | 380/228 |
| 2008/0031451 A1* | 2/2008 | Poirier | 380/228 |
| 2008/0134213 A1* | 6/2008 | Alverson et al. | 719/318 |
| 2009/0013062 A1* | 1/2009 | Blatherwick et al. | 709/222 |

OTHER PUBLICATIONS

Jehoj, et al., "AwareDAV: A Generic WebDAV Notification", Retrieved at http://www2005.org/cdrom/docs/p180.pdf>>, WWW 2005, May 10-14, 2005, Chiba, Japan, pp. 180-189.

"Sun Javatm System Calendar Server 6.3", Retrieved at <<http://www.sun.com/software/products/calendar_srvr/wp_calendarsrvr63.pdf>>, White Paper, Apr. 2007, pp. 40.

Maheshwari, et al., "Design and Implementation of CORBA-Based Subscription Server", Retrieved at <<http://ieeexplore.ieee.org/iel5/7163/19277/00891353.pdf?arnumber=891353>>, pp. 2-13.

* cited by examiner

1

RESOURCE TRACKING

BACKGROUND

Many clients utilize information provided by remote resources. For example, a client (e.g., cell phone, personal computer, PDA, web browser etc.) may express interest in a remote resource (e.g., e-mail service, shared folder, social networking profile, etc.) by creating a subscription to the remote resource within a cloud computing environment. When the state of the remote resource changes, a notification is provided to clients subscribed to the remote resource. The notification may inform the client to update information, stored on the client, relating to the remote resource. For example, a user subscribes through a PDA to a work file folder. When the contents of the work file folder change, the PDA is notified of the change. This allows the PDA to take appropriate action, such as, initiating synchronization with the work file folder. A common approach for managing subscriptions is to store subscription information in persistent stores (e.g., a database). This allows recovery of subscription data if a failure occurs with a service facilitating subscriptions and/or notifications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As more resource become available for clients to utilize, an efficient system for managing information between the client and the resource is desirable. Common subscription services allow a client to express interest in a specified resource as a subscription. The subscription service may monitor the subscribed resource for changes. A change in a resource may comprise an adding of a new file to shared folder or an update to a profile within a social network, for example. Once a change in state of the resource occurs, the subscription service may inform subscribing clients of the change (e.g., the subscription service invokes a notification service to provide a notification of the change to the client). Subscriptions mitigate computing resource because a client receives information regarding subscribed resource, instead of all available resources. Without subscriptions, a service providing information of all available resource to all available clients could be overwhelmed as more clients and resources participate with the service.

Current subscription services and/or notification services store subscription and/or notification data within persistent storage (e.g., a database stored on a hard disk). Storing data in persistent storage is a way to protect the data in the event a service consuming the data fails. The data in persistent storage may be unaffected by the service failing (e.g., the runtime fails, the server reboots, etc.) because it is not stored in volatile memory. A drawback to using persistent storage is the high latency of persistent storage. In contrast, soft memory (e.g., RAM, volatile memory, etc.) has a low latency, but is susceptible to data loss upon a service failure. The low latency allows for an efficient system to manage a large number of services, resources, and/or resource changes.

An alternative technique for tracking a resource is provided herein. A notification service and a subscription service are utilized to accomplish resource tracking. The notification service creates a queue corresponding to the client. When a message is received regarding information about queue ownership, the notification service stores a notification within the queue about the information. It may be appreciated that information about queue ownership may comprise, but is not limited to, a change in a subscribed resource, a service failure, a peer-to-peer invite, and/or any other information associated with the client, services, and/or resources.

The subscription service provides a mechanism for a client to subscribe to a resource. The subscription service monitors the resource and distributes information to the notification service of resource changes. The client is configured to periodically send requests to the notification service to extract notifications from the queue associated with the client. The client may access the notification service and/or subscription service through one or more protocols (e.g., a generic protocol, HTTP, TPC, etc.). Soft memory is used to store data associated with the notification service and/or the subscription service (e.g., queue data, subscription data, etc.). Clients can efficiently track changes to resources because data may be accessed (e.g., notifications created and stored in memory, notifications extracted from memory, subscriptions created and stored in memory, etc.) within the low latency soft memory as compared with high latency persistent storage.

To overcome issues with recovering from a failure of the notifications service and/or the subscription service, the client is configured to store relevant information (e.g., what resources are subscribed to, etc.). This allows the client to resubscribe to resources in the event a service fails. To aid in detecting a failure, the notification service is configured with a current notification service identifier. If the notification service fails and restarts, a new current notification service identifier is assigned to the notification service. The notification service can detect a failure by comparing the current notification service identifier, stored at notification service, with an identifier comprised within a request from the client (e.g., client sends a request with an identifier identifying the notification service). If the identifier and the current notification service identifier do not match, then a failure is determined and the queue is assumed to be lost due to being stored in soft memory. To recover, the notification service creates a new queue and instructs the client to resubscribe to resources. The notification service is further configured to provide a notification to the client to resubscribe to resources if the subscription service fails.

Storing notification and subscription data in soft memory allows for efficient management of tracking a resource and providing notifications due to the low latency of soft memory. As a safeguard to recovering from data loss in soft memory, clients store some recovery information so that the client can restore subscriptions and receive lost notifications due to a failure.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
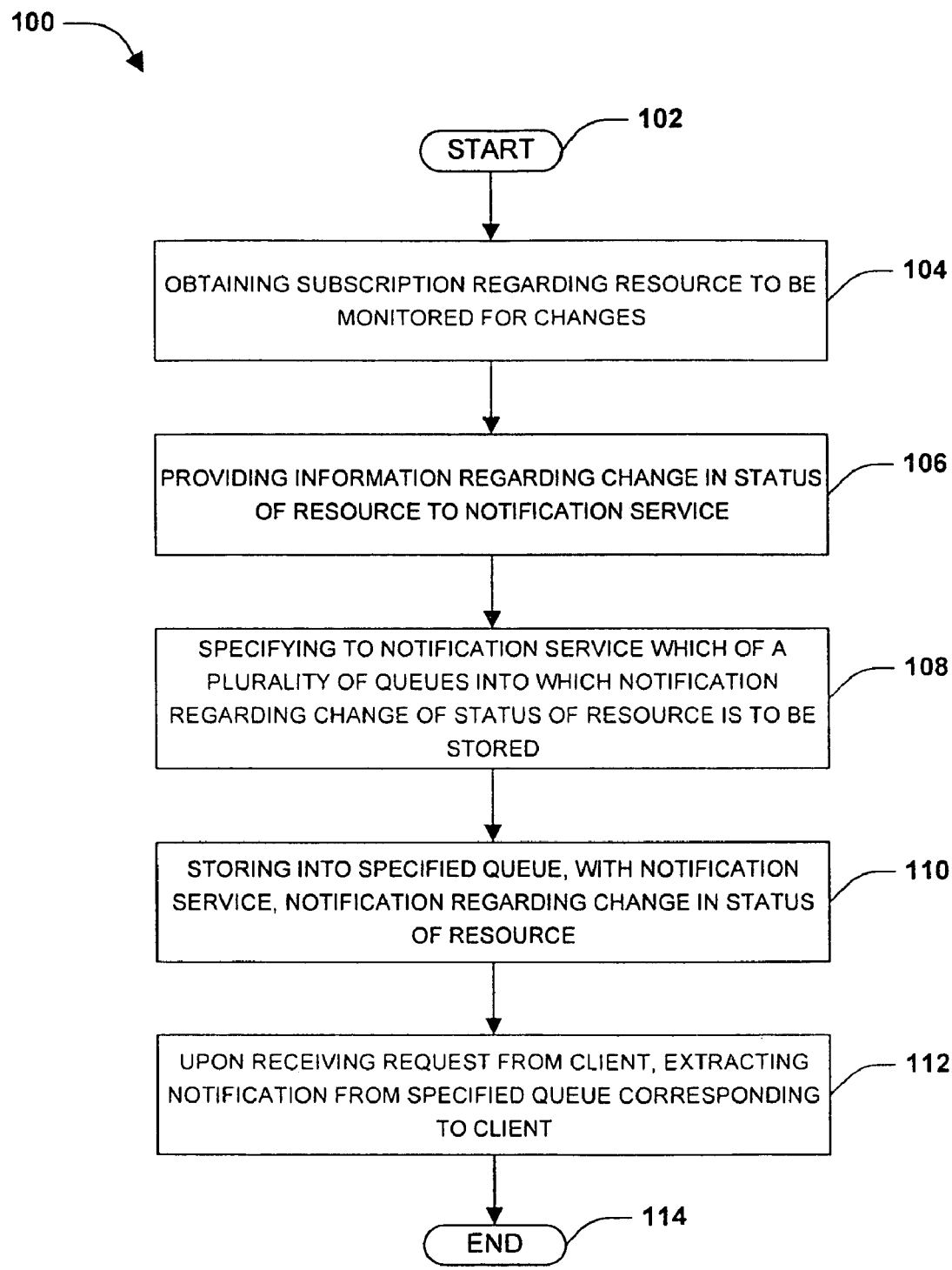
FIG. 1 is a flow chart illustrating an exemplary method of tracking a resource.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

A growing number of resources are available for clients to interact with. For example, a cloud computing environment provides computing services that clients may access. A client may be a web browser, a cell phone, a personal computer, and/or any other entity that is capable of communicating with the services (e.g., a resource available within a mesh). Examples of a resource (e.g., a service) may be a shared file folder, a profile in a social networking utility, a shared calendar, and/or any other service available for a client to interact with. One way a client may interact with a resource is through subscribing to the resource. By subscribing to the resource, the client is notified of changes to the resource, for example, a file is added to a file folder or a profile is updated on a social networking utility.

One or more services may be used to facilitate resource subscriptions and notifications of changes. These services may be spread across multiple separate servers. Currently, when a client expresses interest in a resource (e.g., the client sends a request for a subscription service to create a subscription to the resource), a service may store the subscription data and/or notifications within persistent storage (e.g., a database stored on a hard disk). This allows the service to recover from service failures without data loss. One drawback is that persistent storage has a high latency, which may diminish the efficiency of the service as more clients and resources participate.

As provided herein, a resource may be efficiently track for a client through a notification service and a subscription service. The subscription service manages subscriptions for multiple clients with multiple resource interests. A subscription may comprise a reference to a queue, associated with the client, that is to be notified of resource changes and a URL associated with the resource to be monitored. The notification service facilitates the creation, storage, and delivery of notifications to clients. Notifications may comprise information about a change in a subscribed resource, a service failure, etc.

The subscription service is configured to create a subscription for a client that expresses interest in a resource. The subscription service monitors the resource for changes. Upon a change in the resource, the subscription service distributes information of the resource change to the notification service. The subscription service may instruct the notification service into which queue to store a notification of the resource change. Subscriptions are managed in an efficient manner because the client is not overwhelmed with notifications of resources changes the client is not interested in. Secondly, the subscription service may associate a time to live with resources and clients. If the time to live expires due to inactivity (e.g., falls below a predetermined threshold), then the resource or client is removed; therefore, the subscription service is not burdened by outdated subscriptions.

The notification service is configured to create a queue associated with a client, upon request from the client. The notification service stores within the queue information regarding the ownership of the queue. Information regarding the ownership of the queue may comprise a change in a subscribed resource, a service failure, a peer-to-peer invite, and/or other information associated with the client, services, and/or resources. For example, a subscription service may detect a subscribed resource has changed. The subscription service informs the notification service of the resource change and instructs the notification service into which queue to store a notification. The notification service creates a notification of the change, and stores the notification in the queue associated with the client subscribed to the resource. The client is then able to retrieve the notification from the queue and take further appropriate action.

A client may be configured to store some information regarding subscription and notification data. This information may be used as a recovery mechanism. In case a service fails, the client has enough information to resubscribe to resources the client is interested in. The client stores recovery information because the notification service data and the subscription service data is stored within volatile memory to mitigate latency issues with persistent storage.

The client may be further configured to send a request to the notification service. The request may comprise an instruction to create a queue; an instruction to extract a notification from the queue; an identifier corresponding to a notification service identifier; and/or a queue identifier corresponding to a queue associated with the client. A request to extract a notification from the queue provides a delivery mechanism for a client to receive information regarding resource changes, service failures, and/or other relevant information to queue ownership.

The client may also send a request to the subscription service, the request comprising a resource that is to be monitored and a queue identifier associated with a queue that is to be notified of changes to the monitored resource. The request provides the subscription service with information about which resource to monitor and where to send information of changes to the monitored resource.

Because notification data and subscription data are stored in volatile memory, the notification service may be configured to determine a notification service failure and/or a subscription service failure. This allows recovery measures to be taken if a queue and/or subscriptions are lost. To detect a subscription service failure, the notification service is configured to watch for a loss in subscriptions or the subscription service. The notification service may be further configured to receive messages of subscription data loss. Upon receiving a message that the subscription service failed, the notification service stores a notification into one or more queues associated with clients associated with the subscription service (e.g., the subscription service hosted subscriptions for the client). The notification may comprise a message that the subscription service failed and an instruction for the client to resubscribe to resources the client is interested in.

To accomplish determining a notification service failure, the notification service comprises a current notification service identifier. The current notification service identifier may be a distinct value associated with a particular runtime instance of the notification service. A new value may be assigned to the current notification service identifier if the notification service fails and restarts. A request from a client comprises an identifier corresponding to the current notification service identifier. The notification service is able to detect a failure if the identifier from the request does not match the current notification service identifier.

For example, when a notification service starts up, a new value is assigned to a current notification service identifier. If the notification service fails and restarts, a new value is assigned to the current notification service identifier. When the client sends a request with an identifier, the notification service determines whether values of the identifier and the current notification service identifier match. If the values match, then a notification service failure has not occurred. If the values do not match, then the notification service may assume a previous failure and restart (e.g., a new value was assigned to the current notification service identifier).

Upon making a determination the values match (e.g., the notification service has not failed), the notification service process the request. If the values do not match, the notification service assumes a notification service failure and the queue was lost. The notification service creates a new queue with a new queue identifier. The notification service stores a notification into the new queue. The notification may comprise a message that the notification service failed; an instruction to resubscribe to one or more resources; the new queue identifier; and/or the current notification service identifier. Upon receiving the notification, the client refreshes all or substantially all its state, since the lost queue could have comprised one or more notifications of change. Additionally, the client may resubscribe to resources because the client locally stores some subscription data, so that the new queue can keep track of these subscriptions going forward.

One embodiment of tracking a resource is illustrated by an exemplary method 100 in FIG. 1. At 102, the method begins. At 104, a subscription regarding a resource to be monitored for changes is obtained. For example, a client may express an interest in a resource. The client sends a request, to create a subscription to the resource, to a subscription service. The request may comprise information regarding the resource (e.g., a URL to resource) and information regarding a destination for the subscription service to distribute messages of resources change to (e.g., a queue identifier, a notification service identifier, etc.). The subscription service may store the subscription in a list of subscriptions. The subscription service may use the list of subscriptions to determine which resources to monitor and where to distribute information regarding resource changes.

At 106, information regarding a change in status of the resource is provided to a notification service. Once the subscription is obtained, the resource may be monitored for changes (e.g., a subscription service listens for messages that a resource changed, the subscription service check a resource to see if there is a change, etc.). Upon a detection of a resource change, the subscription service sends information of the change to the notification service. The subscription service may send the information periodically, when a change of a resource is detected, and/or arbitrarily. The information may be sent from the subscription service monitoring the resource to the notification service.

At 108, into which of a plurality of queues a notification regarding the change of status of the resource is to be stored is specified to the notification service. The notification service is informed which queue to store a notification because the notification service may host multiple queues corresponding to multiple clients. When a resource changes, the notification service notifies clients that are subscribed to the changed resource, not the clients without subscriptions. For example, a subscription service may send a message to the notification service to store a notification within one or more queues corresponding to clients subscribed to a resource that changed. The message may comprise one or more queue identifiers identifying the queues a notification is to be stored in.

At 110, the notification service stores the notification of resource status change into the specified queue. The notification service may add additional information into the notification. At 112, upon receiving a request from a client, the notification is extracted from the specified queue corresponding to the client. The queue corresponding to the client may have been created in response to the client requesting the notification service to create a queue. In response to the request, the notification service may have created a queue with a queue identifier. Further requests, such as 112, may comprise the queue identifier and/or an identifier associated with the notification service. This allows the notification service to extract messages from the appropriate queue that corresponds to the client making the request. The queue identifier allows the notification service to store the notification in the appropriate queue, even though the notification service may host multiple queues for multiple clients.

The client may periodically or arbitrarily send requests to the notification service. The request may comprise an instruction to create a queue; an instruction to extract a notification from the queue; an identifier corresponding to a notification service identifier; and/or a queue identifier corresponding to a queue associated with the client. The client is able to efficiently track subscribed resources because the client can request notifications to be extracted from the appropriate queue. At 114, the method ends.

Figure 2:
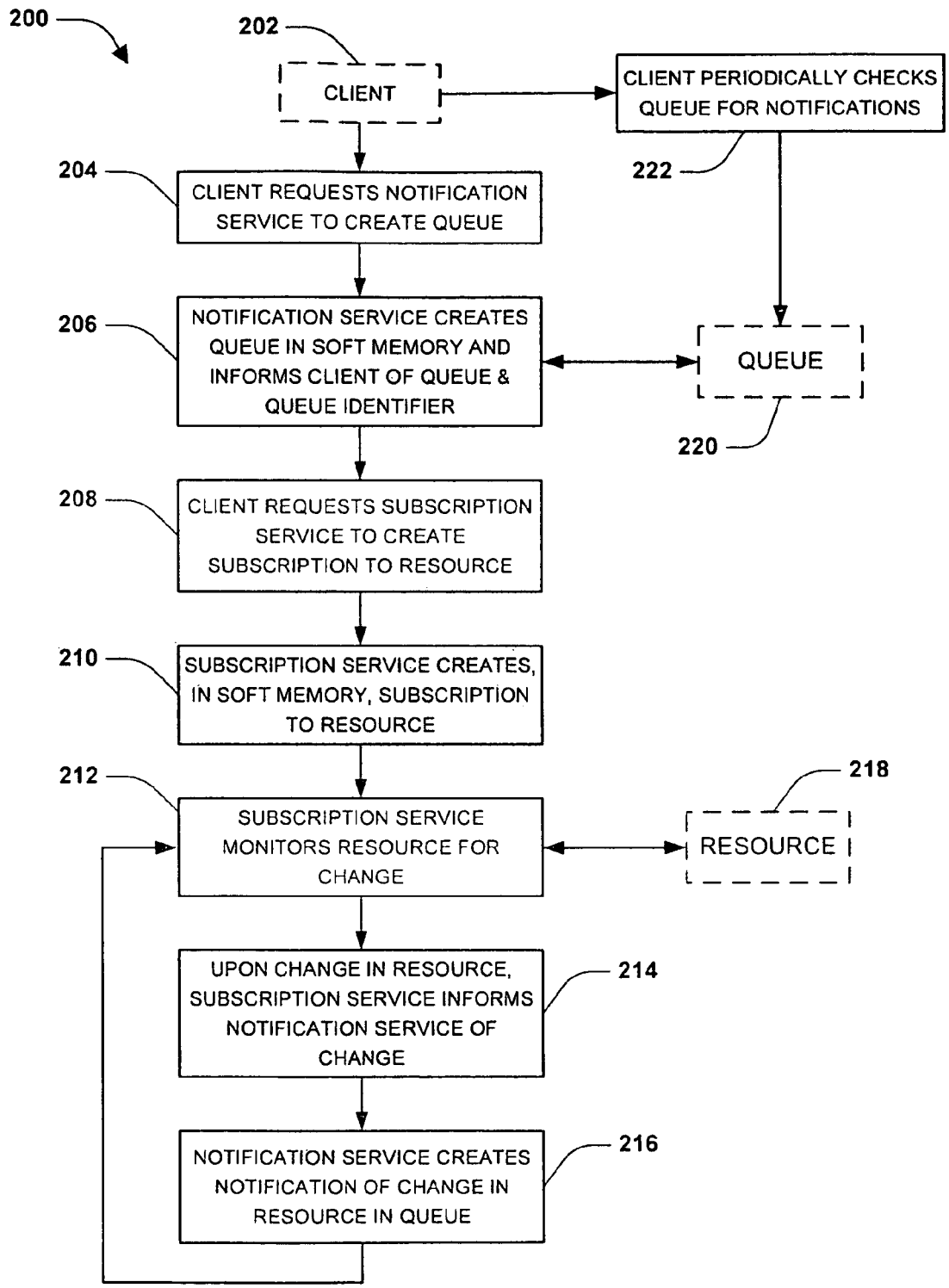
FIG. 2 is a flow chart illustrating an exemplary method of tracking a resource.

A second embodiment of tracking a resource is illustrated by an exemplary method 200 in FIG. 2. At 204, a client 202 requests a notification service to create a queue. At 206, the notification service creates the queue in soft memory (e.g., volatile RAM memory) and informs the client 202 of the queue 220 and a queue identifier. The queue identifier is used by the client 202 and a subscription service when communicating with the notification service. For example at 222, the client periodically checks the queue 220 for notifications. When checking the queue 220, the client may send a request comprising the queue identifier and/or other information to the notification service. In another example, the subscription service send a message to the notification service, which may comprise the queue identifier used to identify which queue to store a notification in.

At 208, the client 202 requests the subscription service to create a subscription to a resource 218 that is to be monitored. The request may comprise information regarding the queue 220 (e.g., a queue identifier) that is to be informed of changes to the resource 218 and/or information regarding the resource 218 (e.g., a URL of the resource 218). The information regarding the resource 218 is sent because the subscription service is able to distinguish the resource 218 from a multitude of available resources. The information regarding the queue 220 is sent because the notification service may host a plurality of queue for multiple clients. Notifications of a change in subscribed resource may be sent to the clients subscribing to the resource (e.g., a notification stored in the corresponding queue); with no notification sent to non-subscribing clients.

At 210, the subscription service creates, in soft memory, the subscription to the resource 218. The subscription service may maintain a subscription lists comprising one or more subscriptions. The subscription may be stored within the list. The subscription may comprise the information regarding the resource 218 and the queue 220. At 212, the subscription service monitors the resource 218 for changes. Upon a change in the resource 218, the subscription service informs the notification service of the change. The subscription service may send information of the change and/or the information of which queue to store a notification within. It may be appreciated that the subscription service may also provide information of a failure of a subscription, a failure of the subscription service, and/or other relevant information to the notification service. The subscription service continues monitoring the resource 218 and/or other subscribed resources.

At 216, the notification service creates a notification of the change in the resource 218 in queue 220. This allows the client 202 to check the queue 220 to the notification regarding the change in resource 218. It may be appreciated that the notification service may provide additional information and/or additional notification comprising: a service failure message, an identifier, a peer-to-peer request, and/or other relevant information regarding the ownership of the queue 220.

Figure 3:
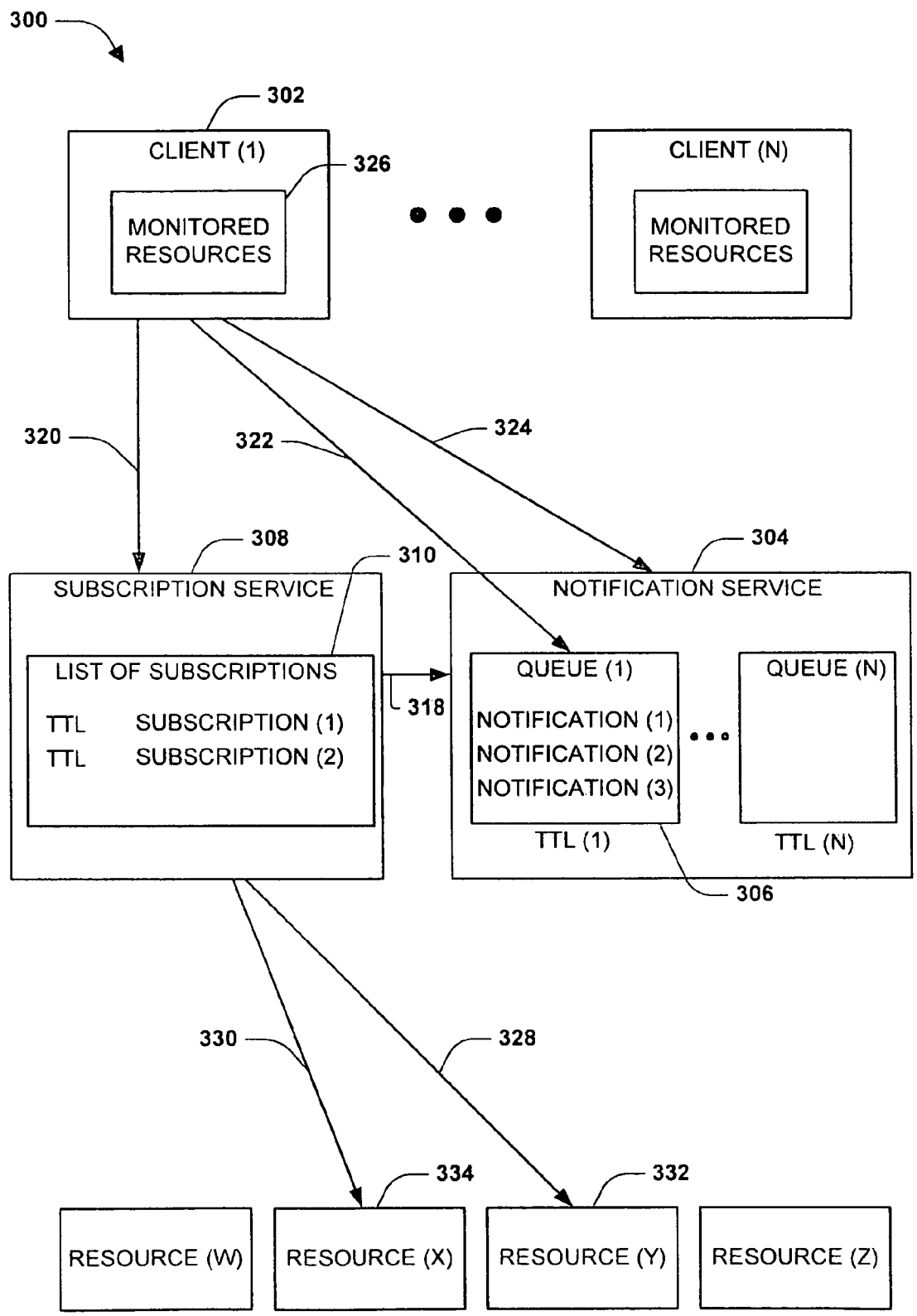
FIG. 3 is a component block diagram illustrating an exemplary system for tracking one or more resources.

FIG. 3 illustrates an example of a system 300 configured to track one or more resources. The system 300 comprises a subscription service 308 and a notification service 304. The notification service 304 stores a plurality of queues associated with one or more clients (e.g., a client has a corresponding queue associated with the client). The subscription service 308 comprises a list of subscriptions 310. Data associated with the notification service 304 and the subscription service 308 may be stored in soft memory to provide efficiency and performance.

A client (1) 302 may be one of a plurality of clients that are associated with the system 300. Client (1) 302 send a request 324 to the notification service 304, the request 324 comprising an instruction to create a queue associated with client (1) 302. The notification service 304 creates a queue (1) 306 associated with client (1) 302. The notification service 304 may associate a TTL (1) time-to-live value the queue (1), wherein if the TTL (1) times out, then the queue (1) 306 and/or the client (1) 302 are removed from then notification service 304. This allows the notification service to remove expired client information to improve efficiency.

Once the queue (1) 306 is created, the notification service assigns a queue identifier with the queue and notifies the client (1) 302 of the queue identifier and/or an identifier for the client (1) 302 to use when sending requests to the notification service 304. The client (1) 302 may periodically send a request 322 to the notification service 304. The request 322 may comprise the identifier associated with the notification service, the queue identifier, and/or an instruction (e.g., a instruction for the notification service 304 to remove a notification, such as notification (1), from the queue (1) 306).

The client (1) 302 may send a request 320 to the subscription service 308 to create a subscription to one or more resources (e.g., a subscription to a resource (x) 334 and a subscription to a resource (y) 332). Resource (x) 334 and resource (y) 332 may be two of a plurality of available resources that the client (1) 302 may subscribe to. The client (1) 302 may send the queue identifier corresponding to queue (1) 306 and instruct the subscription service 308 to inform the queue (1) 306 of changes to the subscribed resources. For example, the subscription service 308 may create a subscription (1) entry and a subscription (2) entry with corresponding TTL time-to-live values. Subscription (1) entry may correspond to queue (1) and resource (x) 334. Subscription (2) entry may correspond to queue (1) and resource (y) 332. The subscription service 308 may monitor 330 resource (x) 334 and monitor 328 resource (y) 332 for changes.

Upon detecting a change in one of the monitored resources, the subscription service 308 sends information 318 to the notification service 304 of a change in the monitored resource. The information 318 may comprise information regarding the change in the monitored resource and which queue to store a notification within. The subscription service 308 may also send information 318 regarding a failure in a subscription and/or subscription service. Once the notification service 304 receives information 318, the notification stores a notification within the appropriate queue corresponding to a client that subscribed to the resource.

Client (1) 302 may comprise monitored resources information 326. The monitored resources information 326 may be used by the client (1) 302 for recovery purposes. For example, if the notification service 304 determines a failure of the notification service 304 and/or the subscription service 308, then the client (1) 302 may receive a notification of a failure and an instruction to resubscribe to resources the client (1) 302 is interested in (e.g., resource (x) 334 and resource (y) 332). If the client (1) 302 receives a notification of a notification service failure (e.g., a queue loss), then the client (1) 302 refreshes all its state, since the lost queue (1) 306 could have comprised one or more notifications of change. Additionally, the client (1) 302 may resubscribe to resource (x) 334 and resource (y) 332, because the client (1) 302 locally stores some subscription data (e.g., the monitored resources information 326), so that the new queue can keep track of these subscriptions going forward.

Figure 4:
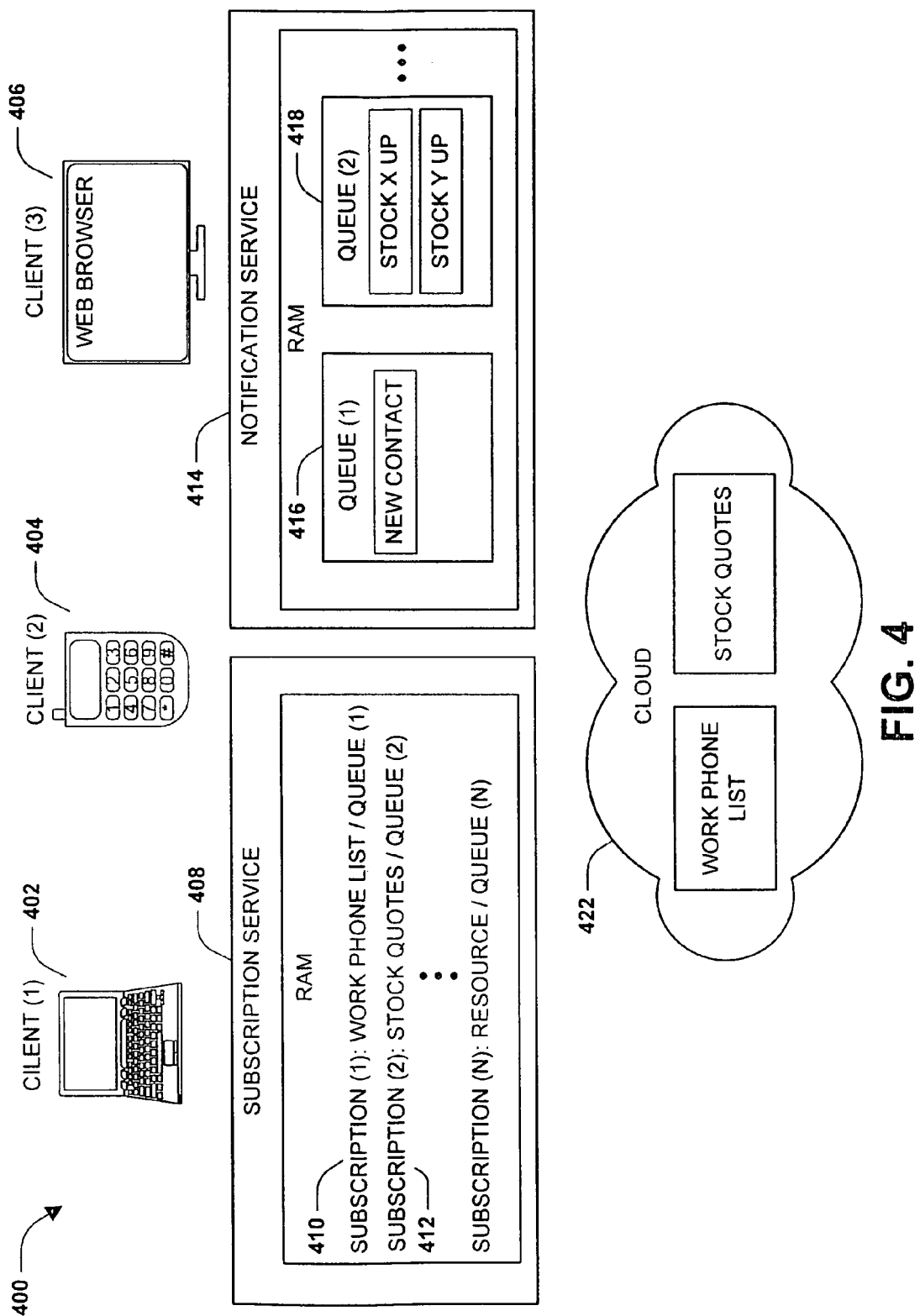
FIG. 4 is a component block diagram illustrating an exemplary system for tracking one or more resources.

FIG. 4 illustrates an example of a system 400 configured to track one or more resources. The system 400 comprises a subscription service 408 and a notification service 414. One or more clients may participate in the system 400 by request a queue from the notification service 414, requesting one or more subscriptions from the subscription service 408, and check for notifications from the queue associated with the client. A client may be any entity that is configured to interact with information from resources. For examples, a client (1) 402 is a laptop, a client (2) 404 is a cell phone, and a client (3) 406 is a web browser. The notification service creates and hosts a queue corresponding to the client. A queue (1) 416 is associated with client (1) 402 and a queue (2) 418 is associated with client (2) 404. The notification service stores notifications within the queue corresponding to the client the notification is targeted for. The queues and notifications are stored within RAM memory for efficiency and performance.

The subscription service 408 creates subscriptions corresponding to a client and a resource. For example, a subscription (1) 410 comprises a reference to a work phone list resources accessible within a cloud 422 computing environment. The subscription (1) 410 further comprises a reference to queue (1) 416, since queue (1) 416 is to be notified when the work phone list resource changes. Therefore, client (1) 402 will receive notifications of resource changes through the notifications within queue (1) 416. The subscription service 408 monitors the work phone list for changes (e.g., a new contact is added to the phone list). Upon a change in the work phone list resource, the subscription service 408 informs the notification service to stores a notification within queue (1) 416 about the new contact.

In another example, client (2) 404 requests the notification service 414 to create queue 418. The client (2) 404 next request the subscription service 408 to create a subscription (2) 412 to a stock quotes resource within the cloud 422 computing environment. The subscription service 408 monitors the stock quotes resource for changes. Upon noticing a change (e.g., an alert is available that stock X is up), the subscription service 408 informs the notification service 414 to stores a notification within queue (2) 418 that stock X is up. The next time client (2) 404 checks queue (2) 418 for notifications, stock X is up may be extracted.

Figure 5:
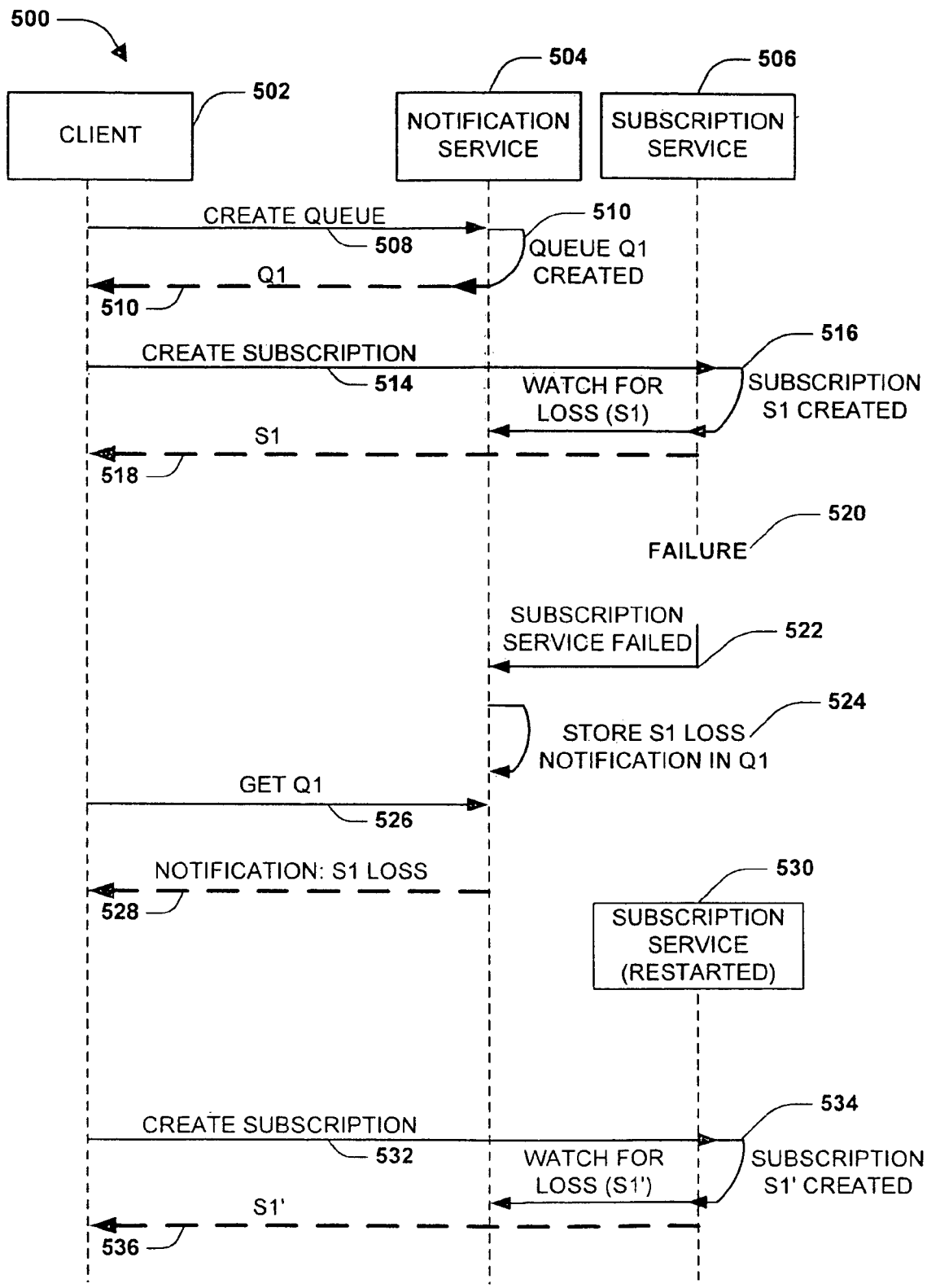
FIG. 5 is an illustration of an example of recovering from a subscription service failure

FIG. 5 illustrates an example 500 of recovering from a subscription service failure. A client 502 sends a request 508 to a notification service 504. The request 508 instructs the notification service 504 to create a queue. The notification service 504 creates a queue Q1 and stores a notification 510 that the queue Q1 was created. The client 502 receives the notification 510 that the queue Q1 was created and is associated with client 502.

The client 502 sends a request 514 to a subscription service 506. The request 514 instructs the subscription service 506 to create a subscription to a resource. The subscription service 506 creates the subscription S1 and sends a message 516 that the subscription S1 was created. The notification service 504 watches for a loss of the subscription S1. The client 502 receives a notification 518 that the subscription S1 was created.

At 520, a failure occurs of the subscription service 506. A failure may occur because the subscription service runtime fails, a server hosting the subscription service fails, and/or any other reason. At 522, the notification service 504 determines that the subscription service failed. The notification service 504 stores a notification 524 in queue Q1 that subscription S1 was lost. The client 502 sends a request 526 to the notification service 504 to extract one or more notifications within the queue Q1. The client 502 receives the notification 528 that subscription S1 was lost.

At 503, a subscription service 530 is restarted. To recover from the loss of subscription S1, the client 502 sends a request 532 for the subscription service 530 to create a new subscription S1'. The subscription service 530 creates the new subscription S1' and sends a message 534 that the subscription S1 was created. The notification service 504 watches for a loss of the new subscription S1'. The client 502 receives a notification 536 that the new subscription S1' was created.

Figure 6:
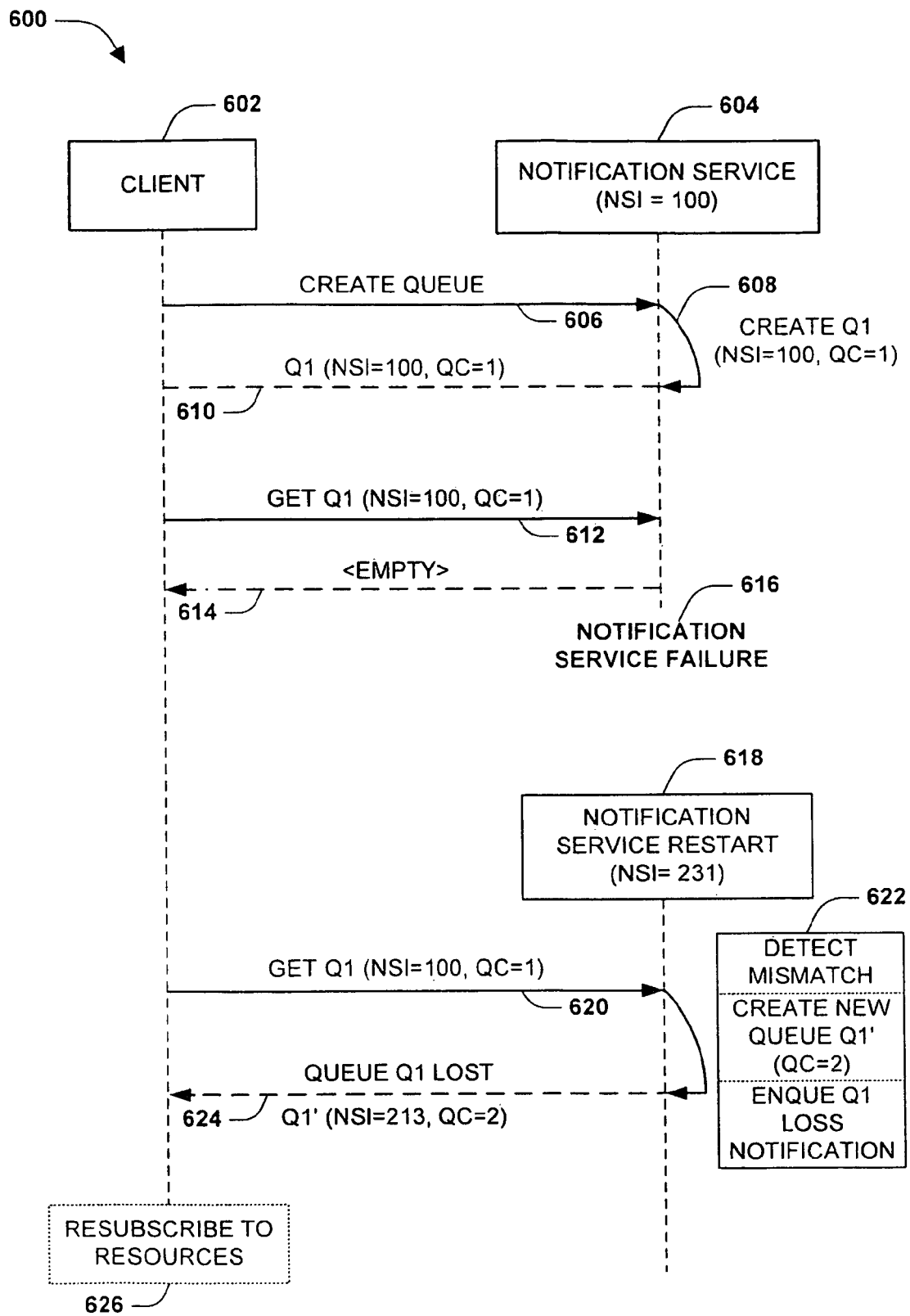
FIG. 6 is an illustration of an example of determining a notification service failure and recovering from the notification service failure

FIG. 6 illustrates an example 600 of determining a notification service failure and recovering from the notification service failure. A notification service 604 is configured with a current notification service identifier (NSI=100) of 100. In the event the notification service fails, the current notification service identifier will be assigned a new value. The new value may be distinctive from previous values.

A client 602 sends a request 606 to the notification service 604. The request 606 instructs the notification service 604 to create a queue. The notification service 604 creates a queue Q1. The queue Q1 is configured with a queue identifier (QC=1) of 1. When a queue is created, it is assigned a queue identifier that may be distinctive from other queue identifiers.

The notification service 604 stores a notification 608 comprising a message that queue Q1 was created; the queue identifier to be used by the client 602 when referencing the queue Q1 associated with the client 602; and/or an identifier to be used when sending requests to the notification service 604, the identifier correlating to the current notification service identifier. The client 602 receives the notification 610. The client 602 may be configured to check the queue Q1 for notifications by sending a request to the notification service 604. The request may comprise an instruction for the notification service to extract a notification from the queue Q1, the identifier, and/or the queue identifier. For example, the client 602 sends a request 612 to the notification service 604. Upon receiving the request 612, the notification service 604 determines that there are no notifications within the queue Q1. The notification service 604 informs the client 602 that the queue Q1 is empty.

When the notification service 604 receives a request from the client 602, the notification service 604 extracts the identifier. The notification service 604 compares the identifier with the current notification service identifier. This allows the notification service to determine if there has been a notification service failure. If a failure occurs, it may be assumed that the notification service 604 has restarted and was assigned a new value for the current notification service identifier. Because the client 602 does not have information regarding the new value yet, the client 602 will send with the next request then old value as the identifier. If the value of the identifier and the new value of the current notification service identifier do not match, then it may be assumed that the notification service 604 failed and restarted.

For example, the notification service 604 fails, at 616. Once the notification service restarts 618, a new value (NSI=231) is assigned to the current notification service identifier. When the client 602 sends a request 620 to check the queue Q1 for notifications, the notification service 604 makes a determination, at 622, that the identifier sent with the request (NSI=100) does not match the current notification service identifier (NSI=231). Because a mismatch was determined, the notification service 604 creates a new queue Q1' with a queue identifier (QC=1). The notification service 604 stores a notification comprising information that queue Q1 was lost; Q1' was created; the queue identifier (QC=1) that is to be used to reference which queue to extract notifications from; and/or an identifier corresponding to the value of the current notification service identifier.

The client 602 receives the notification 624. Upon receiving the notification, the client 602 refreshes all or substantially all its state, since the queue Q1 was lost and could have comprised one or more notifications of change. Additionally, the client 602 may resubscribe 626 to resources because the client 602 locally stores some subscription data, so that the new queue Q1' can keep track of these subscriptions going forward.

Figure 7:
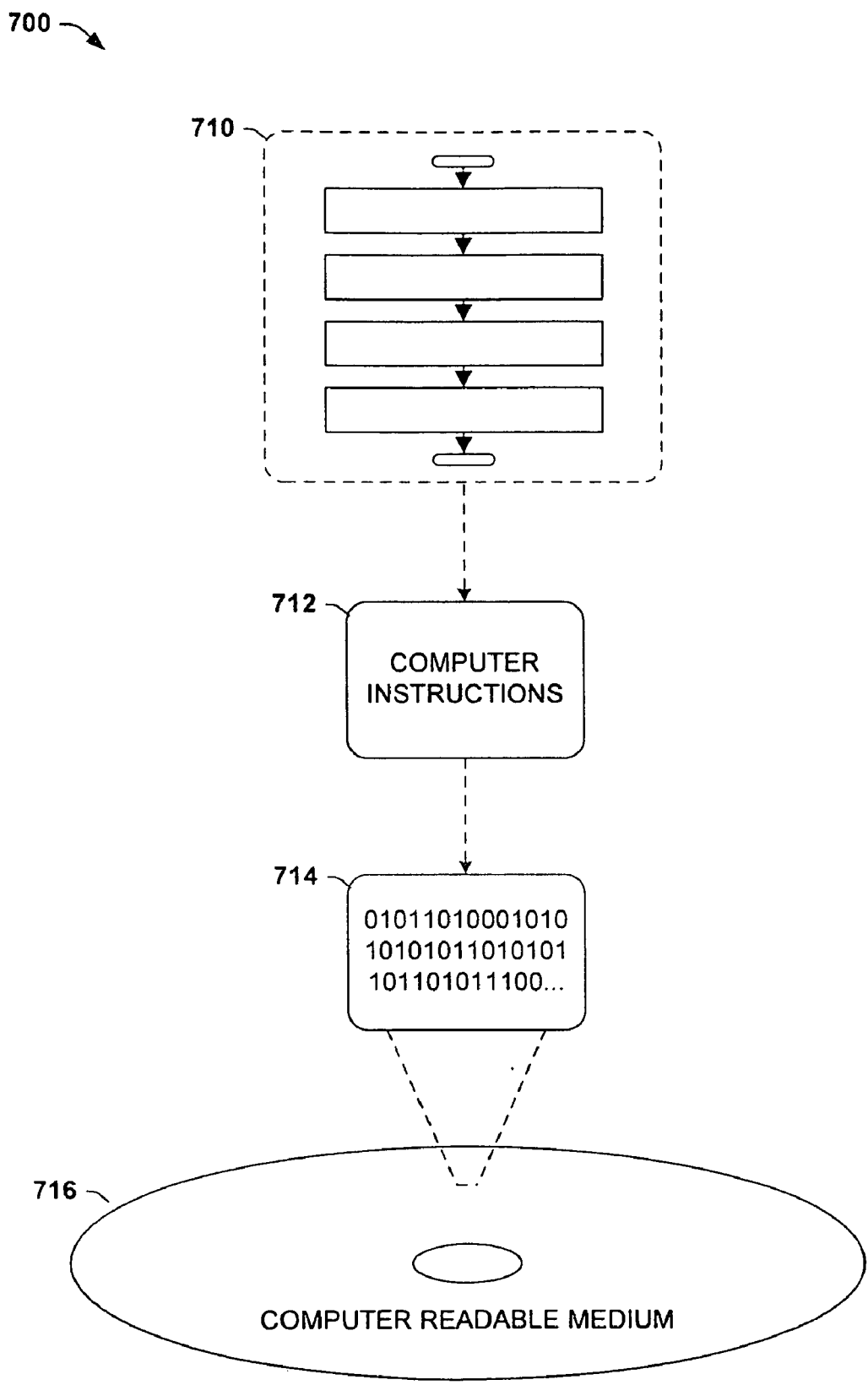
FIG. 7 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 7, wherein the implementation 700 comprises a computer-readable medium 716 (e.g., a CD-R, DVD-R, or a platter of a hard disk drive), on which is encoded computer-readable data 710. This computer-readable data 710 in turn comprises a set of computer instructions 712 configured to operate according to one or more of the principles set forth herein. In one such embodiment 700, the processor-executable instructions 714 may be configured to perform a method, such as the exemplary method 100 of FIG. 1, for example. In another such embodiment, the processor-executable instructions 714 may be configured to implement a system, such as the exemplary system 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 8:
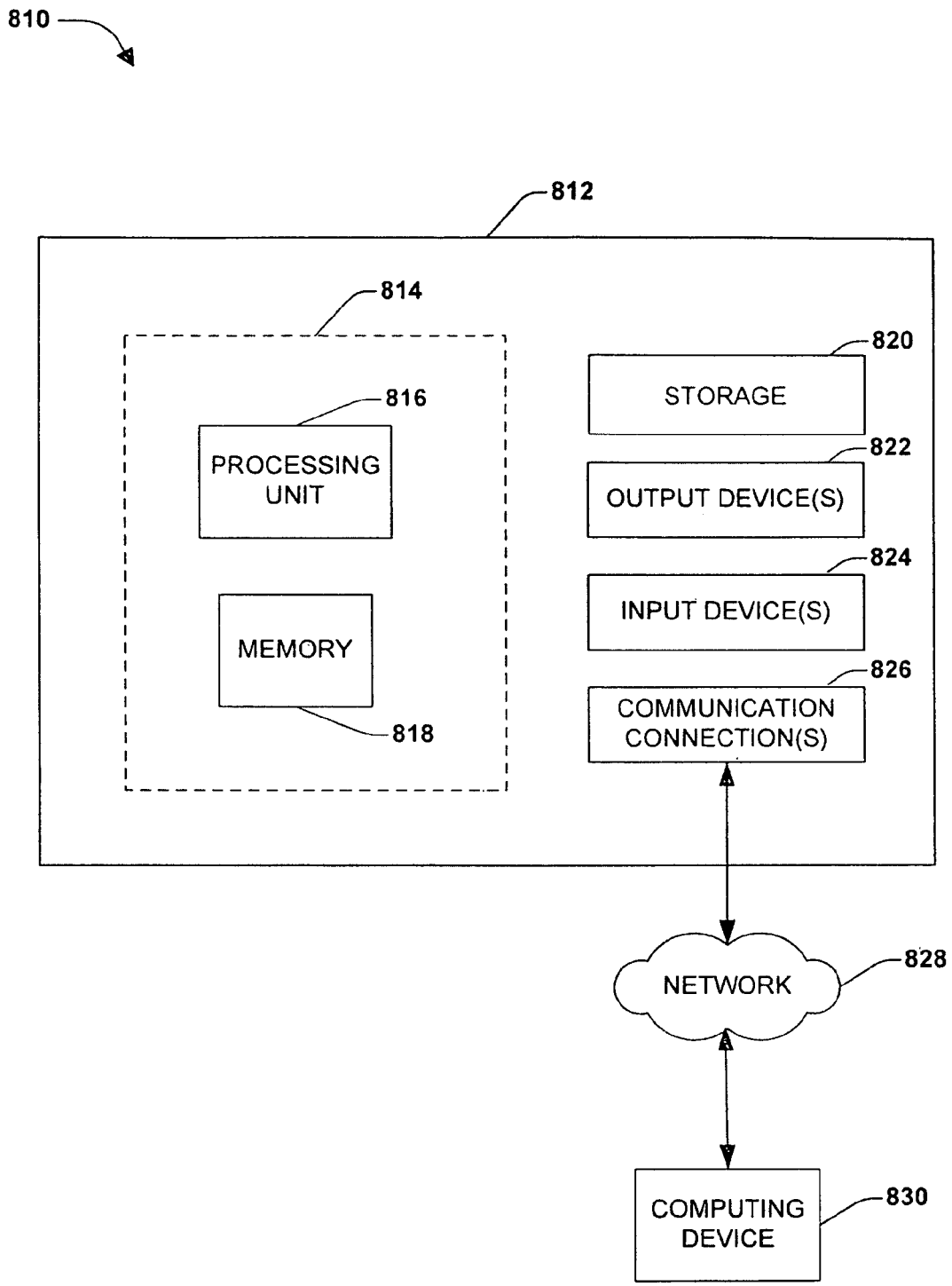
FIG. 8 illustrates an exemplary computing environment wherein one or more of the provisions set forth herein may be implemented.

FIG. 8 and the following discussion provide a brief, general description of a suitable computing environment to implement embodiments of one or more of the provisions set forth herein. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 8 illustrates an example of a system 810 comprising a computing device 812 configured to implement one or more embodiments provided herein. In one configuration, computing device 812 includes at least one processing unit 816 and memory 818. Depending on the exact configuration and type of computing device, memory 818 may be volatile (such as RAM, for example), non-volatile (such as ROM, flash memory, etc., for example) or some combination of the two. This configuration is illustrated in FIG. 8 by dashed line 814.

In other embodiments, device 812 may include additional features and/or functionality. For example, device 812 may also include additional storage (e.g., removable and/or non-removable) including, but not limited to, magnetic storage, optical storage, and the like. Such additional storage is illustrated in FIG. 8 by storage 820. In one embodiment, computer readable instructions to implement one or more embodiments provided herein may be in storage 820. Storage 820 may also store other computer readable instructions to implement an operating system, an application program, and the like. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 812. Any such computer storage media may be part of device 812.

Device 812 may also include communication connection(s) 826 that allows device 812 to communicate with other devices. Communication connection(s) 826 may include, but is not limited to, a modem, a Network Interface Card (NIC), an integrated network interface, a radio frequency transmitter/receiver, an infrared port, a USB connection, or other interfaces for connecting computing device 812 to other computing devices. Communication connection(s) 826 may include a wired connection or a wireless connection. Communication connection(s) 826 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 812 may include input device(s) 824 such as keyboard, mouse, pen, voice input device, touch input device, infrared cameras, video input devices, and/or any other input device. Output device(s) 822 such as one or more displays, speakers, printers, and/or any other output device may also be included in device 812. Input device(s) 824 and output device(s) 822 may be connected to device 812 via a wired connection, wireless connection, or any combination thereof. In one embodiment an input device or an output device from another computing device may be used as input device(s) 824 or output device(s) 822 for computing device 812.

Components of computing device 812 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 812 may be interconnected by a network. For example, memory 818 may be comprised of multiple physical memory units located in different physical locations interconnected by a network.

Those skilled in the art will realize that storage devices utilized to store computer readable instructions may be distributed across a network. For example, a computing device 830 accessible via network 828 may store computer readable instructions to implement one or more embodiments provided herein. Computing device 812 may access computing device 830 and download a part or all of the computer readable instructions for execution. Alternatively, computing device 812 may download pieces of the computer readable instructions, as needed, or some instructions may be executed at computing device 812 and some at computing device 830.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A system for distributing information regarding a resource, comprising:
    a notification service configured to:
        maintain a queue within volatile memory on behalf of a client, comprising:
            storing one or more notifications within the queue, a notification corresponding to a change of a resource that is monitored by a subscription service on behalf of the client; and
            providing the client with read access to the queue;
        monitor for a subscription state loss associated with the subscription service, comprising:
            responsive to identifying the subscription state loss associated with the subscription service, storing a subscription service failure notification within the queue; and
        monitor for a queue state loss associated with the notification service, comprising:
            responsive to identifying the queue state loss associated with the notification service, creating a new queue to replace the queue and storing a notification service failure notification within the new queue, at least some of the notification service implemented at least in part via a processing unit.

2. The system of claim 1, the notification service configured to:
    receive a request from the client to access the queue, the request comprising a notification service identifier that identifies the notification service and a queue identifier that identifies the queue; and
    responsive to the notification service identifier matching a current notification service identifier that identifies a current instance of the notification service, provide the client with access to the queue identified by the queue identifier.

3. The system of claim 1, the notification service configured to:
    receive a request from the client to access the queue, the request comprising a notification service identifier that identifies the notification service and a queue identifier that identifies the queue;
    identify the queue state loss based upon the notification service identifier not matching a current notification service identifier that identifies a current instance of the notification service; and
    responsive to identifying the queue state loss:
        create the new queue comprising a new queue identifier; and
        store the notification service failure notification within the new queue, the notification service failure notification comprising at least one of:
            a message that the notification service failed;
            an instruction for the client to resubscribe, with the subscription service, to the resource;
            the new queue identifier identifying the new queue maintained on behalf of the client by the notification service; or
            the current notification service identifier that identifies the current instance of the notification service.

4. The system of claim 1, the subscription service failure notification comprising at least one of a message that the subscription service failed or an instruction for the client to resubscribe to the resource with the subscription service.

5. The system of claim 1, the notification service configured to:
- receive a subscription update, corresponding to a change in the resource subscribed to by the client through the subscription service, from the subscription service, the subscription update comprising a queue identifier that identifies the queue maintained by the notification service on behalf of the client; and
- store a notification of the subscription update within the queue identified by the queue identifier.

6. The system of claim 1, the notification service configured to:
- maintain a plurality of queues associated with one or more clients; and
- store a notification of a subscription update, corresponding to a change in a target resource subscribed to by a target client through the subscription service, within a target queue maintained on behalf of the target client based upon the subscription update comprising a target queue identifier that identifies the target queue.

7. The system of claim 1, the notification service configured to receive a request from the client, the request comprising at least one of:
- a create queue instruction;
- an instruction to extract one or more notifications from the queue;
- a notification service identifier corresponding to a current instance or a prior instance of the notification service; or
- a queue identifier corresponding to the queue.

8. The system of claim 1, comprising:
the subscription service configured to:
- receive a subscription request from the client to monitor the resource for changes, the subscription request comprising a resource identifier that identifies the resource and a queue identifier that identifies the queue maintained by the notification service on behalf of the client; and
- create a subscription to the resource.

9. The system of claim 8, the subscription service configured to:
- store, at the client, subscription information regarding the subscription.

10. The system of claim 8, the subscription service configured to:
- store the subscription within volatile memory.

11. The system of claim 8, the subscription service configured to:
- responsive to detecting a change to the resource, send a subscription update to the notification service, the subscription update comprising the queue identifier that identifies the queue within which the notification service is to store a notification of the subscription update.

12. The system of claim 8, the subscription service configured to:
- associate a time to live value with the resource; and
- remove the subscription to the resource responsive to the time to live value falling below a threshold.

13. The system of claim 8, the subscription comprising at least one of:
- the queue identifier for the queue; or
- an address associated with the resource.

14. The system of claim 8, the resource comprising social network data.

15. A method for distributing information regarding a resource, comprising:
- maintaining a queue within volatile memory on behalf of a client, the maintaining comprising:
  - storing one or more notifications within the queue, a notification corresponding to a change of a resource that is monitored by a subscription service on behalf of the client; and
  - providing the client with read access to the queue;
- monitoring for a subscription state loss associated with the subscription service, the monitoring for a subscription state loss comprising:
  - responsive to identifying the subscription state loss associated with the subscription service, storing a subscription service failure notification within the queue; and
- monitoring for a queue state loss associated with a notification service, the monitoring for a queue state loss comprising:
  - responsive to identifying the queue state loss associated with the notification service, creating a new queue to replace the queue and storing a notification service failure notification within the new queue, at least some of at least one of the maintaining, the monitoring for a subscription state loss, or the monitoring for a queue state loss implemented at least in part via a processing unit.

16. The method of claim 15, comprising:
- receiving a request from the client to access the queue, the request comprising a notification service identifier that identifies the notification service and a queue identifier that identifies the queue; and
- responsive to the notification service identifier matching a current notification service identifier that identifies a current instance of the notification service, providing the client with access to the queue identified by the queue identifier.

17. The method of claim 15, comprising:
- receiving a request from the client to access the queue, the request comprising a notification service identifier that identifies the notification service and a queue identifier that identifies the queue;
- identifying the queue state loss based upon the notification service identifier not matching a current notification service identifier that identifies a current instance of the notification service; and
- responsive to identifying the queue state loss:
  - creating the new queue comprising a new queue identifier; and
  - storing the notification service failure notification within the new queue, the notification service failure notification comprising at least one of:
    - a message that the notification service failed;
    - an instruction for the client to resubscribe, with the subscription service, to the resource;
    - the new queue identifier identifying the new queue maintained on behalf of the client by the notification service; or
    - the current notification service identifier that identifies the current instance of the notification service.

18. The method of claim 15, comprising:
- receiving a subscription update, corresponding to a change in the resource subscribed to by the client through the subscription service, from the subscription service, the subscription update comprising a queue identifier that identifies the queue maintained by the notification service on behalf of the client; and
- storing a notification of the subscription update within the queue.

19. A computer-readable medium comprising processor-executable instructions that when executed perform a method for distributing information regarding a resource, comprising:
- maintaining a queue within volatile memory on behalf of a client, the maintaining comprising:
  - storing one or more notifications within the queue, a notification corresponding to a change of a resource that is monitored by a subscription service on behalf of the client; and
  - providing the client with read access to the queue;
- monitoring for a subscription state loss associated with the subscription service, the monitoring for a subscription state loss comprising:
  - responsive to identifying the subscription state loss associated with the subscription service, storing a subscription service failure notification within the queue; and
- monitoring for a queue state loss associated with a notification service, the monitoring for a queue state loss comprising:
  - responsive to identifying the queue state loss associated with the notification service, creating a new queue to replace the queue and storing a notification service failure notification within the new queue.

20. The computer-readable medium of claim 19, comprising:
- receiving a request from the client to access the queue, the request comprising a notification service identifier that identifies the notification service and a queue identifier that identifies the queue;
- identifying the queue state loss based upon the notification service identifier not matching a current notification service identifier that identifies a current instance of the notification service; and
- responsive to identifying the queue state loss:
  - creating the new queue comprising a new queue identifier; and
  - storing the notification service failure notification within the new queue, the notification service failure notification comprising at least one of:
    - a message that the notification service failed;
    - an instruction for the client to resubscribe, with the subscription service, to the resource;
    - the new queue identifier identifying the new queue maintained on behalf of the client by the notification service; or
    - the current notification service identifier that identifies the current instance of the notification service.

* * * * *